US009224185B2

(12) United States Patent
Wang et al.

(10) Patent No.: US 9,224,185 B2
(45) Date of Patent: Dec. 29, 2015

(54) FAST STORAGE METHOD FOR IMAGE DATA, VALUABLE-FILE IDENTIFYING METHOD AND IDENTIFYING DEVICE THEREOF

(71) Applicant: GRG Banking Equipment Co., Ltd., Guangzhou, Guangdong (CN)

(72) Inventors: Rongqiu Wang, Guangzhou (CN); Tuowen Xiang, Guangzhou (CN); Chaoyang Xu, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 30 days.

(21) Appl. No.: 14/348,389

(22) PCT Filed: Oct. 26, 2012

(86) PCT No.: PCT/CN2012/083584
§ 371 (c)(1),
(2) Date: Mar. 28, 2014

(87) PCT Pub. No.: WO2013/075571
PCT Pub. Date: May 30, 2013

(65) Prior Publication Data
US 2014/0286526 A1    Sep. 25, 2014

(30) Foreign Application Priority Data

Nov. 24, 2011  (CN) .......................... 2011 1 0380229

(51) Int. Cl.
*G06K 9/00* (2006.01)
*G06T 1/00* (2006.01)
*G06F 17/30* (2006.01)

(52) U.S. Cl.
CPC .......... *G06T 1/0057* (2013.01); *G06F 17/3028* (2013.01)

(58) Field of Classification Search
None
See application file for complete search history.

(56) References Cited

U.S. PATENT DOCUMENTS

2009/0141048 A1   6/2009  Fujimoto et al.
2011/0199117 A1*  8/2011  Hutchings et al. ...... G06M 3/00
                                                  326/38

FOREIGN PATENT DOCUMENTS

CN    101257629 A    9/2008
CN    101287057 A    10/2008
(Continued)

OTHER PUBLICATIONS

Tai, Huafeng, and Huang Daqing. A Region of Interest Image Compression Algorithm Based on Wavelet Transforms. College of Information Science and Technology / Unmanned Aircraft Vehicle Research Institute, Sep. 2010.*
(Continued)

*Primary Examiner* — Nirav Patel
*Assistant Examiner* — Amandeep Saini
(74) *Attorney, Agent, or Firm* — Wolf, Greenfield & Sacks, P.C.

(57) ABSTRACT

Disclosed are a valuable-file identifying method and an identifying device thereof. The identifying method and the identifying device store image data of a valuable file using a fast storage method for image data. The fast storage method for image data comprises: compulsively converting collected single-byte image data into long-integer image data; using N data masks which correspond to each other through a "bitwise AND" operation to extract the long-integer image data in such a manner that N points are extracted from M*N points in each line and one point is extracted from L points in each column, where N is an integer greater than or equal to 2, L and M are all integers greater than or equal to 1; and integrating the data extracted respectively by N data masks through a "bitwise OR" operation to obtain coded image data and store same. In conclusion, the present invention converts single-byte image data into long-integer image data, and extracts multipoint data at one time using a plurality of data masks which correspond to each other, reducing the number of operations, and achieving fast, compressed storage of images.

11 Claims, 3 Drawing Sheets

(56) References Cited

FOREIGN PATENT DOCUMENTS

| CN | 101908891 A | 12/2010 |
|---|---|---|
| CN | 101945203 A | 1/2011 |
| CN | 122521278 A | 6/2012 |

OTHER PUBLICATIONS

International Search Report dated Feb. 14, 2013 from corresponding International Application PCT/CN2012/083584.

Chinese Search Report dated Feb. 28, 2013 from corresponding Chinese Application No. 201110380229.9 English Abstract.

Tai, H. et al., *A method of ROI image compression based on wavelet transforms*, Journal of English Suzhou University of Science and Technology (Natural Science), vol. 27 No. 3, p. 51-54).

\* cited by examiner

FAST STORAGE METHOD FOR IMAGE DATA, VALUABLE-FILE IDENTIFYING METHOD AND IDENTIFYING DEVICE THEREOF

This application is the National Stage application of PCT international application PCT/CN2012/083584, filed on Oct. 26, 2012 which claims the priority of Chinese Patent Application No. 201110380229.9, entitled "FAST STORAGE METHOD OF IMAGE DATA, SECURITY DOCUMENT IDENTIFICATION METHOD AND APPARATUS", filed on Nov. 24, 2011 with Chinese Patent Office, which applications are incorporated herein by reference to the maximum extent allowable by law.

FIELD OF THE INVENTION

The present invention relates to an fast storage method of image data, and in particular to an fast storage method of image data which can quickly compress and store the image data and a security document identification method and apparatus for storing an image data of the security document by the above mentioned fast storage method of the image data.

BACKGROUND OF THE INVENTION

For a security document identification apparatus, there is commonly a difficulty in the storage of a sample image. The key problem is that since the data volume of the sample image is large and the identification apparatus has to operate fast and continuously, the time for storage is short. An ordinary teller machine processes eight security documents per second, the average processing time for each of the security documents is 125 ms, the overhead of the system is about 20 ms, the time for the serial port communication is 15 ms, the sample images are collected in parallel which cost about 10 ms in the total CPU time, therefore the remaining time is about: 125 ms−20 ms−15 ms−10 ms=80 ms. Based on a TMS320 platform with the frequency of 600MCPU, the time for identifying the security documents (including category, denomination, orientation, counterfeit, serial number) is about 65 ms, and thus the time for storing the sample image must be controlled in less than 15 ms. It is needed to store at least three sample images so as to store complete image information. Now it is assumed that, among the three sample images, one image is a white light sample image with a resolution of 480*800, another image is an infrared sample image with a resolution of 240*400, and a third image is a transmission sample image with a resolution of 240*400. In the white light sample image, the resolution of 480*800 is only used for the serial number area. The resolution of 240*400 is actually used. Therefore, it may be chosen to store all of the three sample images, or to convert the white light sample image into an image with the resolution of 240*400 and then store the three images with the resolution of 240*400. In the case of the storage in accordance with the existing two methods, the time-consuming is as follows:

1. if the image is stored point-by-point, the total number of operations is 240*400+240*400+480*800=576,000. In the off-chip storage based on the TMS320 platform of 600MCPU frequency, the three images are stored as images with the resolution of 240*400. That is to say, the two images with middle resolution are directly stored; and for the image with high resolution, one row is stored every two rows and one column is stored every two column, so that the data volume of the image with high resolution is a quarter of the original data volume. In this way, the storage time is about 70 ms (the image resolution conversion and storage are performed simultaneously) and is still far slower than 15 ms.

2. If a mass of images is copied, namely if a basic function of C language, i.e. the memcpy function, is used, the storage time is about 18 ms and still can not meet the requirement. It is disadvantage that this function requires continuous occupation of CPU which can not be interrupted. The continuous occupation conflicts with the image collection. The copy of a large amount of data may cause that the image collection is completely disordered and the system is broken down.

In summary, the use of the traditional image storage method is unable to meet the requirement to store the three high-resolution images in 15 ms, which even breaks the system down. Therefore, if the images need to be stored, it is only possible to reduce the identification speed of the device or decrease the functions of identification of the device.

Therefore, a method which can fast store the image data is needed to solve the above mentioned problem.

SUMMARY OF THE INVENTION

The object of the invention is to provide a fast storage method of image data which is used to fast store the image data.

Another object of the invention is to provide a security document identification method for fast storing image data of a collected security document.

Yet another object of the invention is to provide a security document identification apparatus for fast storing an image data of a collected security document.

In order to achieve the above mentioned objects, the disclosure provides a fast storage method of image data which is used to compress and store the image data of a security document collected during the identification of the security document, including: (A1) obtaining long integer type image data; (A2) extracting the long integer type image data by using N mutually corresponding data masks via a "bitwise AND" operation, wherein extraction step comprises: extracting M points from M*N points of each row and extracting one point from L points of each column, wherein N is an integer greater than or equal to 2, L and M are integers greater than or equal to 1; (A3) performing a "bitwise OR" operation for the data extracted respectively by the N data masks, so as to obtain and store coded image data. Generally, the image data directly collected by a security document identification apparatus is single-byte image data, and therefore it is needed to forcibly convert the collected single-byte image data into long integer type image data before the storage.

Preferably, the step (A2) further includes: dividing the long integer type image data into N parts equally, and extracting the long integer type image data in the N parts by using the N mutually corresponding data masks via the "bitwise AND" operation respectively.

In order to achieve another object of the invention, the invention further provides a security document identification method for identifying a current security document, including: (B1) collecting sample images of the current security document and obtaining corresponding image data; (B2) performing a security document identification based on the image data of the current security document, so as to obtain an identification data of the security document; (B3) forcibly converting the collected image data into long integer type image data; and (B4) compressing and storing the converted data image by using the image data fast storage method.

Preferably, before the step (B1), it is detected whether the current security document enters a sampling area; if yes, the image data is collected; else the detection is continuously performed. In this way, the invention can perform automatic detection without an artificial operation.

Preferably, the sample images include an infrared sample image, a transmission sample image and a white light sample image, and the step (B4) specifically comprises: directly storing the long integer type image data of the infrared sample image and the transmission sample image, and storing the long integer type image data of the white light sample image by using the fast storage method of the image data. In order to store complete image information, the infrared sample image, the transmission sample image and the white light sample image are often required. However, since the resolutions of the infrared sample image and the transmission sample image are not high, their image data can already be stored in a faster speed after their image data is converted to the long integer type image data. For example, in the case that an 8-byte data type is used to store an infrared sample image of 240*400 pixels, only 135 clock cycles are needed, the speed becomes nearly eight times faster, therefore the infrared sample image no need to be compressed before the storage. However, the pixel of the long integer type image of the white light sample image are relative larger, it is not sufficient to store the converted long integer type image data in the desired speed, and there is also a need for the compression operation so as to achieve the fast storage.

Preferably, the security document identification method according to the invention further includes: (B5) recovering the compressed and stored image data to obtain a decompressed image data; and (B6) determining whether the current security document is counterfeit according to the image data of the current security document to further obtain identification data of the security document. The identification and authenticity of the security document needs to recover the compressed and stored image data to obtain the decompressed image data, rather than are performed directly based on the compressed and stored image data. The identification data of the security document includes information such as the type, denomination, orientation, sequence number and authenticity of the current security document. Particularly, the serial number information of the current security document may be identified according to the image data of the collected white light sample image, and other identification data, such as the authenticity information of the current security document may be analyzed by using the stored image data. Therefore, the invention also needs to decompress the compressed and stored image data. The step (B5) specifically includes: calculating data of each pixel point of the decompressed image template based on the size data of the decompressed image template and the compressed and stored image data, so as to obtain the decompressed image data.

The invention also provides a corresponding security document identification apparatus for identifying a current security document. The apparatus includes a collecting module, an identification module, a compression module and a storage module. The collecting module is adapted to collect sample images of a current security document and obtain corresponding image data; an identification module is adapted to perform a security document identification based on the image data of the current security document, so as to obtain identification data of the security document; the compression module includes a conversion unit and an encoding unit, wherein the conversion unit forcibly converts the collected image data into long integer type image data; and the encoding unit extracts the long integer type image data by using N mutually corresponding data masks via a "bitwise AND" operation respectively, and then performs a "bitwise OR" operation for the data extracted respectively by the N data masks so as to obtain and store coded image data, wherein the extraction method includes extracting M points from M*N points of each row and extracting one point from L points of each column, wherein N is an integer greater than or equal to 2, L and M are integers greater than or equal to 1; and the storage module is adapted to store the data.

Preferably, the encoding unit is adapted to divide the long integer type image data into N parts equally, and extracting the long integer type image data in the N parts by using the N mutually corresponding data masks via the "bitwise AND" operation respectively.

Preferably, the security document identification apparatus further includes a decompression module adapted to recover the encoded image data to obtain decompressed image data.

Preferably, the collecting module is a contact image sensor. The contact image sensor can detect whether the current security document enters a sampling area, and collect the image data if the current security document enters the sampling area and continuously detect if the current security document does not enter the sampling area.

Compared with the prior art, in the fast storage method of the image data according to the invention, data of multiple points are extracted at one time by using the multiple mutually corresponding data masks via the "bitwise AND" operations for many times, then the extracted data is re-encoded via the "bitwise OR" operation once, and then the obtained coded image data is stored, so that the times of the operations are greatly reduced and the fast compression and storage of the image data are achieved. Correspondingly, the processing time for the security document identification method and the security document identification apparatus for storing image data of a security document by using the above mentioned image data fast storage method is improved, and the system overhead of the security document identification apparatus is reduced. On the other hand, in the security document identification method and the security document identification apparatus according to the invention, the collected single-byte image data is forcibly converted into the long integer type image data instead of the traditional single-byte storage, so that the times of the operations are reduced and the speed of the storage of the image data is further improved.

DETAILED DESCRIPTION OF THE INVENTION

In order to describe in detail the technical content, the structural characteristics, the achieved object and effect of the invention, a detailed description will be given in conjunction with embodiments and the accompanying drawings as follows.

Figure 1:
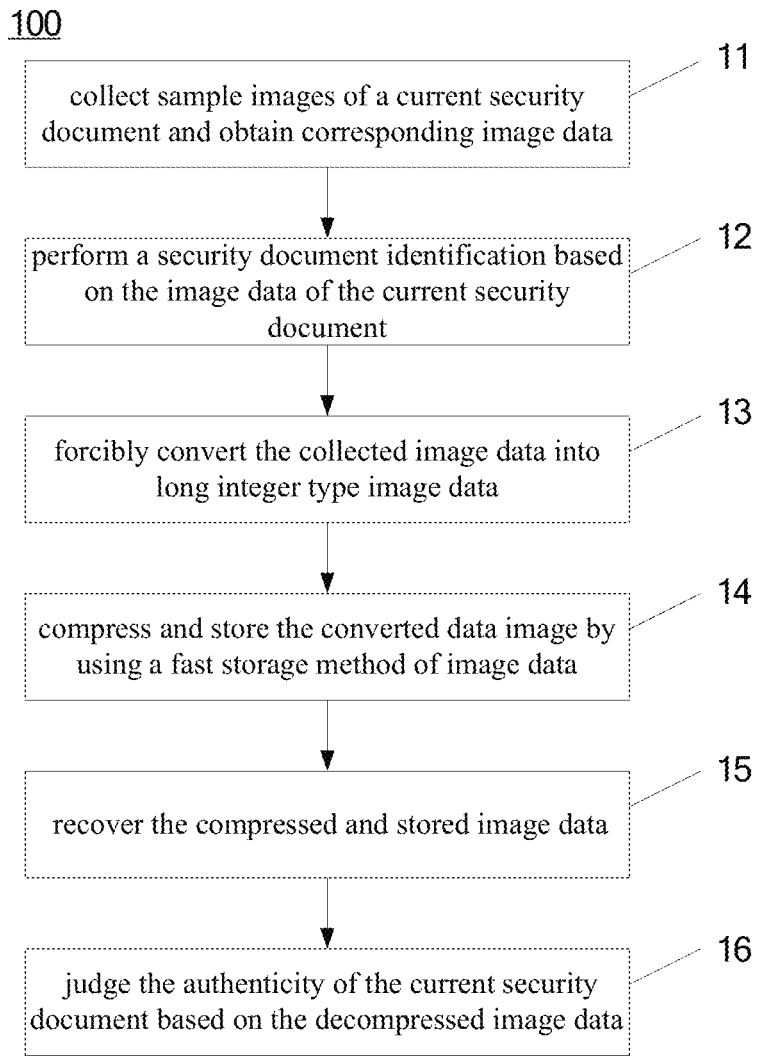
FIG. 1 is a flow chart of a security document identification method according to the invention.

Reference is made to FIG. 1. A security document identification method 100 according to the invention includes: (11) collecting sample images of a current security document and obtaining corresponding image data; (12) performing a security document identification based on the image data of the current security document; (13) forcibly converting the collected image data into long integer type image data; (14) compressing and storing the converted data image by using an fast storage method 200 of the image data; (15) recovering the compressed and stored image data; and (16) judging the authenticity of the current security document based on the decompressed image data. Preferably, before the step (11), it is detected whether the current security document enters a sampling area; and if yes, the image data is collected; else, the detection is continuously performed, so that the invention can perform automatic detection without an artificial operation.

Figure 2:
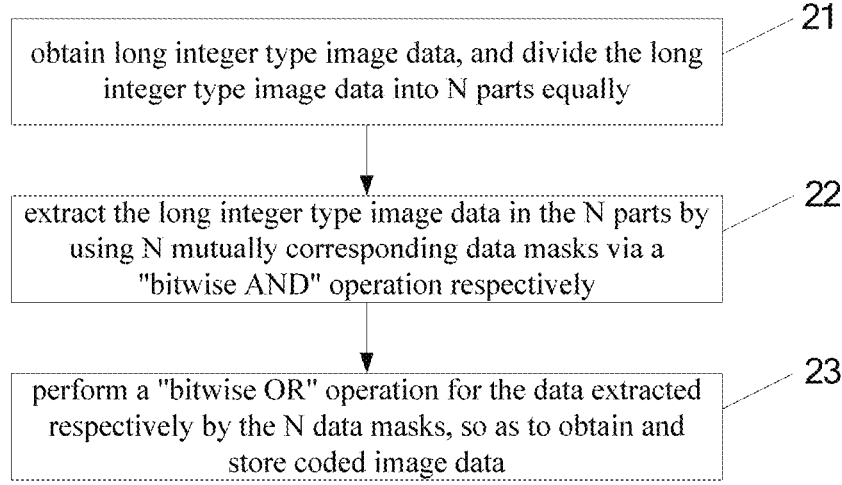
FIG. 2 is a flow chart of an fast storage method of image data according to the invention.

Reference is made to FIG. 2. The fast storage method 200 of the image data includes: (21) obtaining long integer type image data, and dividing the long integer type image data into N parts equally; (22) extracting the long integer type image data in the N partitions by using N mutually corresponding data masks via the "bitwise AND" operation respectively, in which the method for the extracting is to extract M points from M*N points of each row and extract one point from L points of each column, and where N is an integer greater than or equal to 2, L and M are integers greater than or equal to 1; (23) performing a "bitwise OR" operation for the data extracted respectively by the N data masks, so as to obtain and store coded image data.

Figure 3:
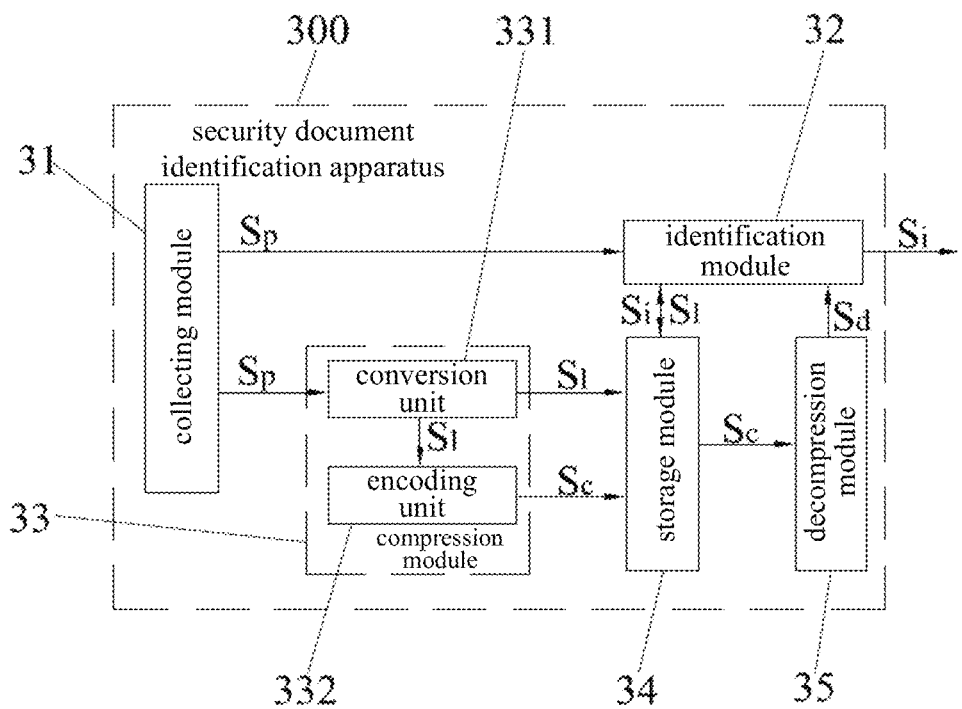
FIG. 3 is a structural block diagram of a security document identification apparatus according to the invention.

Referring to FIG. 3, the security document identification apparatus 300 includes a collecting module 31, an identification module 32, a compression module 33 and a storage module 34 and a decompression module 35. The collecting module 31 collects sample images of a current security document and obtains corresponding image data $S_p$. The identification module 32 performs a security document identification based on the image data of the current security document, so as to obtain and output (to a display or an alarming apparatus, for example) identification data $S_i$ of the security document. The compression module 33 forcibly converts the collected image data $S_p$ into long integer type image data $S_1$, and performs a compression operation (extracting and recoding operations) on the long integer type image data $S_1$, so as to obtain and store coded image data $S_c$. The decompression module 35 is recovers the encoded image data $S_c$ to obtain decompressed image data $S_d$. The storage module 34 is adapted to store the data. Particularly, the collecting module 31 is a contact image sensor. The contact image sensor can detect whether the current security document enters a sampling area, and collect the image data if the current security document enters the sampling area, else continuously detect, so that the invention can perform automatic detection without an artificial operation.

Referring to FIG. 3, the compression module 33 may include a conversion unit 331 and an encoding unit 332. The conversion unit 331 forcibly converts the collected image data $S_p$ into long integer type image data $S_i$. The coding unit 332 divides the long integer type image data $S_i$ equally into N parts, where N is an integer equal to or greater than 2; and the coding unit 332 extracts the long integer type image data in the N parts by using the N mutually corresponding data masks via the "bitwise AND" operation and then integrates the data extracted respectively by the N data masks via a "bitwise OR" operation, so as to obtain and store coded image data $S_c$. The method for the extracting is to extract M points from M*N points of each row and extract one point from L points of each column, where N is an integer greater than or equal to 2, L and M are integers greater than or equal to 1.

Preferably, the sample images collected by the collecting module 31 include an infrared sample image, a transmission sample image and a white light sample image. In addition, the image data $S_{p1}$ of the infrared sample image, the image data $S_{p2}$ of the transmission sample image the and the image data $S_{p3}$ of the white light sample image are obtained. The compression and storage processes for the image data $S_{p1}$, $S_{p2}$, $S_{p3}$ are as follows.

The compression and storage of the image data $S_{p1}$ of the infrared sample image and the image data $S_{p2}$ of the transmission sample image are described. The resolutions of the infrared sample image and the transmission sample image are 240*480. The collected image data $S_{p1}$, $S_{p2}$ is single-byte image data. The conversion unit 331 in the compression module 33 stores the collected single-byte image data $S_{p1}$, $S_{p2}$ with every eight pixels being an unit, so as to convert the single-byte image data $S_{p2}$, $S_{p2}$ into 8-byte of image data $S_{11}$, $S_{12}$ and transmit and store the 8-byte of image data $S_{11}$, $S_{12}$ into the storage module 34. Therefore, the speed for storing the image data $S_{p1}$ of the infrared sample image and the image data $S_{p2}$ of the transmission sample image becomes nearly eight times faster. The data storage in the invention is based on the data storage from SDRAM to SDRAM which requires about 135 clock cycles to store a data unit. In the present embodiment, the 8-byte of data type is employed for the storage, the times for the storage of the infrared sample image and the transmission sample image is: (240*400/8)*2= 24,0000. Therefore the number of the clock cycles spent to store one infrared sample image or one transmission sample image is: 135*24,000=3,240,000.

The compression and storage of the image data $S_{p3}$ of the white light sample image are described. The resolution of the white light sampling image is 480*800, and the collected image data $S_{p3}$ is the single-byte image data. The compression module 33 forcibly converts the collected single-byte image data $S_{p3}$ into 8-byte of image data $S_{13}$, compresses the converted image data to obtain coded image data $S_c$, and transmits and stores the coded image data $S_c$ into the storage module 34. The specific steps are as follows.

1. the conversion unit 331 stores the collected single-byte image data $S_{p3}$ with every eight pixels being an unit, so as to convert the single-byte image data $S_{p3}$ into 8-byte of image data $S_{13}$.

2. the encoding unit 332 divides the 8-byte of image data $S_{13}$ into a U region and a D region, where the U region represents the upper half part of the white light sample image (one grid represents one pixel point), and the region D represents the lower half part of the white light sample image, and the subscript of a value in one block denote the numbers of a row and a column where the pixel point is located.

Reference is made to Table 1 which is a list of 8-byte of image data for a white light sample image.

TABLE 1

| U region | $u_{11}$ | $u_{12}$ | $u_{13}$ | $u_{14}$ | $u_{15}$ | $u_{16}$ | $u_{17}$ | $u_{18}$ | $u_{19}$ | $u_{1a}$ | $u_{1b}$ | $u_{1c}$ | $u_{1d}$ | $u_{1e}$ | $u_{1f}$ | $u_{1g}$ |
|---|---|---|---|---|---|---|---|---|---|---|---|---|---|---|---|---|
| | $u_{21}$ | $u_{22}$ | $u_{23}$ | $u_{24}$ | $u_{25}$ | $u_{26}$ | $u_{27}$ | $u_{28}$ | $u_{29}$ | $u_{2a}$ | $u_{2b}$ | $u_{2c}$ | $u_{2d}$ | $u_{2e}$ | $u_{2f}$ | $u_{2g}$ |
| | $u_{31}$ | $u_{32}$ | $u_{33}$ | $u_{34}$ | $u_{35}$ | $u_{36}$ | $u_{37}$ | $u_{38}$ | $u_{39}$ | $u_{3a}$ | $u_{3b}$ | $u_{3c}$ | $u_{3d}$ | $u_{3e}$ | $u_{3f}$ | $u_{3g}$ |
| | $u_{41}$ | $u_{42}$ | $u_{43}$ | $u_{44}$ | $u_{45}$ | $u_{46}$ | $u_{47}$ | $u_{48}$ | $u_{49}$ | $u_{4a}$ | $u_{4b}$ | $u_{4c}$ | $u_{4d}$ | $u_{4e}$ | $u_{4f}$ | $u_{4g}$ |

TABLE 1-continued

| D region | $d_{11}$ | $d_{12}$ | $d_{13}$ | $d_{14}$ | $d_{15}$ | $d_{16}$ | $d_{17}$ | $d_{18}$ | $d_{19}$ | $d_{1a}$ | $d_{1b}$ | $d_{1c}$ | $d_{1d}$ | $d_{1e}$ | $d_{1f}$ | $d_{1g}$ |
|---|---|---|---|---|---|---|---|---|---|---|---|---|---|---|---|---|
| | $d_{21}$ | $d_{22}$ | $d_{23}$ | $d_{24}$ | $d_{25}$ | $d_{26}$ | $d_{27}$ | $d_{28}$ | $d_{29}$ | $d_{2a}$ | $d_{2b}$ | $d_{2c}$ | $d_{2d}$ | $d_{2e}$ | $d_{2f}$ | $d_{2g}$ |
| | $d_{31}$ | $d_{32}$ | $d_{33}$ | $d_{34}$ | $d_{35}$ | $d_{36}$ | $d_{37}$ | $d_{38}$ | $d_{39}$ | $d_{3a}$ | $d_{3b}$ | $d_{3c}$ | $d_{3d}$ | $d_{3e}$ | $d_{3f}$ | $d_{3g}$ |
| | $d_{41}$ | $d_{42}$ | $d_{43}$ | $d_{44}$ | $d_{45}$ | $d_{46}$ | $d_{47}$ | $d_{48}$ | $d_{49}$ | $d_{4a}$ | $d_{4b}$ | $d_{4c}$ | $d_{4d}$ | $d_{4e}$ | $d_{4f}$ | $d_{4g}$ |

3. The coding unit 332 extracts some points from the 8-byte of image data $S_{13}$ by using two mutually corresponding 8 bytes of data masks M1, M2, so as to obtain 8 bytes of data R1, R2, in which M1=0x00ff00ff00ff00ff and M2=0xff00ff00ff00ff00. The extraction is performed by using the "bitwise AND" operation: R1=A1&M1, R2=B1&M2, where A1 represents 8 byte of image data in the U region, B1 represents 8 byte of image data in the D region. In the present embodiment, N=2, M=1, L=2, and the extraction method is to extract one point from every two points in each row (i.e. to extract one column for every two columns) and to extract one point from every two points in each column (i.e. to extract one row for every two rows), and data in an odd-numbered column and an odd-numbered row is extracted in the U region and data in an even-numbered column and an odd-numbered row is extracted in the D region.

Referring to Table 2, the 8 bytes of image data in the U region is extracted by using the data mask M1.

TABLE 2

| A1 | $u_{11}$ | $u_{12}$ | $u_{13}$ | $u_{14}$ | $u_{15}$ | $u_{16}$ | $u_{17}$ | $u_{18}$ |
|---|---|---|---|---|---|---|---|---|
| M1 | 00 | ff | 00 | ff | 00 | ff | 00 | ff |
| R1 | 00 | $u_{12}$ | 00 | $u_{14}$ | 00 | $u_{16}$ | 00 | $u_{18}$ |

Referring to Table 3, the 8 bytes of image data in the D region is extracted by using the data mask M2.

TABLE 3

| B1 | $d_{11}$ | $d_{12}$ | $d_{13}$ | $d_{14}$ | $d_{15}$ | $d_{16}$ | $d_{17}$ | $d_{18}$ |
|---|---|---|---|---|---|---|---|---|
| M2 | ff | 00 | ff | 00 | ff | 00 | ff | 00 |
| R2 | $d_{11}$ | 00 | $d_{13}$ | 00 | $d_{15}$ | 00 | $d_{17}$ | 00 |

Particularly, 4 valid bytes are extracted from 8 bytes of data in the U region, and 4 valid bytes are extracted from 8 bytes of data in the D region, i.e. totally 8 bytes of valid data are extracted from 16 bytes of data.

4. The 8 bytes of data R1, R2 extracted respectively by M1 and M2 is integrated via a "bitwise OR" operation, so as to obtain the coded image data $S_c$ and store the coded image data $S_c$ into the R region of the storage module 34: R=R1|R2;

Referring to Table 4, the 8 bytes of data R1, R2 extracted respectively by M1 and M2 is integtrated:

TABLE 4

| R1 | 00 | $u_{12}$ | 00 | $u_{14}$ | 00 | $u_{16}$ | 00 | $u_{18}$ |
|---|---|---|---|---|---|---|---|---|
| R2 | $d_{11}$ | 00 | $d_{13}$ | 00 | $d_{15}$ | 00 | $d_{17}$ | 00 |
| R | $d_{11}$ | $u_{12}$ | $d_{13}$ | $u_{14}$ | $d_{15}$ | $u_{16}$ | $d_{17}$ | $u_{18}$ |

Reference is made to Table 5 which is an encoded image data list for the white light sample image.

TABLE 5

| R region | $u_{11}$ | $d_{12}$ | $u_{13}$ | $d_{14}$ | $u_{15}$ | $d_{16}$ | $u_{17}$ | $d_{18}$ | $u_{19}$ | $d_{1a}$ | $u_{1b}$ | $d_{1c}$ | $u_{1d}$ | $d_{1e}$ | $u_{1f}$ | $d_{1g}$ |
|---|---|---|---|---|---|---|---|---|---|---|---|---|---|---|---|---|
| | $u_{31}$ | $d_{32}$ | $u_{33}$ | $d_{34}$ | $u_{35}$ | $d_{36}$ | $u_{37}$ | $d_{38}$ | $u_{39}$ | $d_{3a}$ | $u_{3b}$ | $d_{3c}$ | $u_{3d}$ | $d_{3e}$ | $u_{3f}$ | $d_{3g}$ |

Figure 4A:
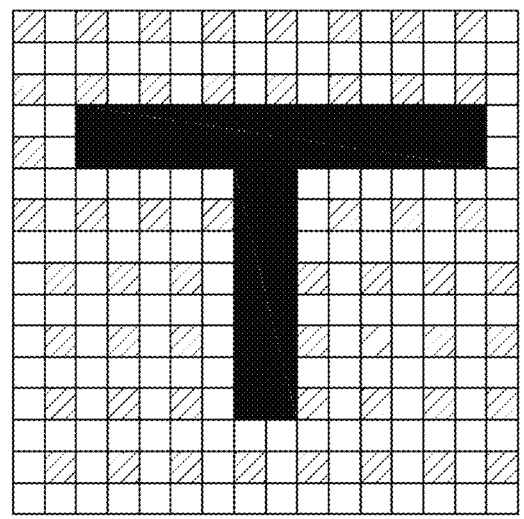
FIG. 4a is a schematic diagram of a white light sample image before the compression according to the invention.
Figure 4B:
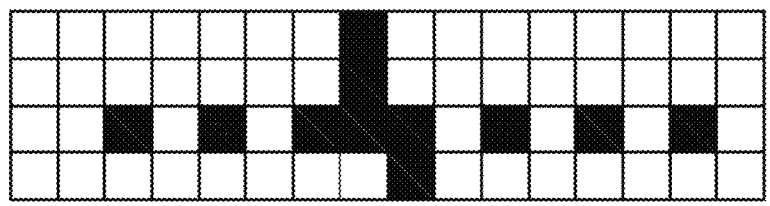
FIG. 4b is a schematic diagram of a white light sample image after the compression according to the invention.
Figure 4C:
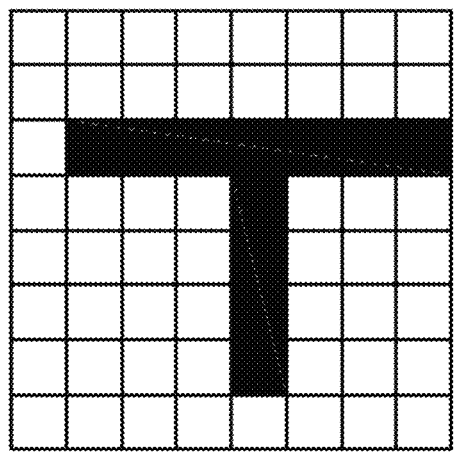
FIG. 4c is a schematic diagram of a white light sample image after the decompression according to the invention.

Reference is made to FIG. 4a to FIG. 4c which are schematic diagrams (original sample images) of a white light sample images before compression, after the compression and after decompression, where the block in FIG. 4a filled with an oblique line represents a valid byte in the data of the point to be extracted. Since the identification and analysis of image can not be directly performed on the compressed image, the encoded image data $S_c$ stored in the R region should be recovered to obtain the decompressed image data $S_d$, so that the compressed image is recovered to the normal image. The specific decompression steps are as follows. The upper half area of the decompressed image is referred to as a U' region, and the lower half area of the decompressed image is referred to as a D' region. In the present embodiment, the number of rows of the decompressed image is half of the number of rows of the image to be compressed, and the number of columns of the decompressed image is half of the number of columns of the image to be compressed, data corresponding to each of the pixel points on the decompressed image template is calculated according to the data of size of the decompressed image template and the encoded image data $S_c$, so as to obtain the decompressed image data $S_d$. Since U', D' and R have the same number of rows, U' takes the odd-numbered columns in the R region and D' takes the even-numbered columns in the R region, and the decompression is performed by using the following formulas: U'(i, j)=R(i, 2j−1) and D'(i, j)=R(i, 2j), where (i, j) represents a data in the $i^{th}$ row and in the $j^{th}$ column in the U' region or the D' region.

Reference is made to Table 6 which is a decompressed image data list for the white light sample image.

TABLE 6

| $u_{11}$ | $u_{13}$ | $u_{15}$ | $u_{17}$ | $u_{19}$ | $u_{1b}$ | $u_{1d}$ | $u_{1f}$ |
|---|---|---|---|---|---|---|---|
| $u_{31}$ | $u_{33}$ | $u_{35}$ | $u_{37}$ | $u_{39}$ | $u_{3b}$ | $u_{3d}$ | $u_{3f}$ |
| $d_{12}$ | $d_{14}$ | $d_{16}$ | $d_{18}$ | $d_{1a}$ | $d_{1c}$ | $d_{1e}$ | $d_{1g}$ |
| $d_{32}$ | $d_{34}$ | $d_{36}$ | $d_{38}$ | $d_{3a}$ | $d_{3c}$ | $d_{3e}$ | $d_{3g}$ |

Referring to Table 1, Table 5 and Table 6, it can be seen that the size of the image data to be compressed is M*N, the size of the compressed image data is M/4*N, and the size of the decompressed image data is M/2*N/2, where in the present embodiment M=480, N=800. Compared with the prior art, the invention operates a 16-byte data per operation by using the "bitwise AND operation" and the "bitwise OR operation" on the basis of the 8 byte data type operation, where the valid data is of 8 bytes, and the number of conversion is one-eighth of that of the conventional method. One conversion needs two "bitwise AND" operation, one "bitwise OR" operation and one conversion operation. Each "bitwise AND" operation or "bitwise OR" operation requires about 20 clock cycles. Therefore the total number of the clock cycles of two "bitwise AND" operation, one "bitwise OR" operation and one conversion operation is about 135+20*3=195, and the time spent in the traditional method/the time spent in the invention: (8*135)/195=5.54. Therefore the speed of the storage becomes about 5.5 times faster. Furthermore, the number of times for the storage of the white light sample image is 240*400/8=12,000, therefore the period spent to store one white light sample image is:

195*12,000=2,340,000.

In summary, based on the TMS320 platform of 600MCPU frequency, it is spent more than 70 ms to store two sample images of the medium resolution (240*400), i.e. one infrared sample image and one transmission sample image, and one white light sample image of the high resolution (480*800) according the traditional method, which is far longer than the desired 15 ms. However, based on the fast storage method according to the invention, 2.340,000+3,240,000=5,580,000; the storage time is: 5,580,000/(600*1024*1024)=9.1*10-3s=9.1 ms; and the time loss due to the "for" cycle and so on is counted together, therefore the total storage time is about 9.6 ms. Thus, the overall speed of the storage becomes 7 times faster or more.

The above embodiment is based on the 8-byte (64-bit) processor. In a second embodiment, in the case that the processor in the invention supports 16 bytes (128 bits), if one point is extracted from every two points, the single-byte image data is converted into 16-byte image data, the data masks are set as follows: M1=0x00ff00ff00ff00ff00ff00ff00ff00ff; M2=0xff00ff00ff00ff00ff00ff00ff00ff00; 32 bytes of data can be operated at one time by the following operation: R=(A1&M1)|(A2&M2), where the 16-byte valid data is extracted. Of course, the similar processing method can be used in a 4-byte processor, a 32-byte the processor.

A third embodiment is based on the 8-byte (64-bit) processor. The extraction method is to extract one point from every four points. The data is divided into four regions, i.e. U1, U2, U3, U4, and four data masks are set as follows: M1=0x000000ff000000ff, M2=0x0000ff000000ff00; M3=0x00ff000000ff0000, M4=0xff000000ff000000. A1, A2, A3, A4 are respectively 8 bytes data in the U1, U2, U3, U4 regions, C=(A1&M1)|(A2&M2)|(A3&M3)|(A4&M4). In this way, 32 bytes of data can be operated at one time, and the 8 byte of valid data is extracted. Similar method can be used to extract one point from every eight points or from every sixteen points.

A fourth embodiment is also based on the 8-byte (64-bit) processor. If the extraction method is to extract one point from every three points, the implement is a slightly different from the above method. The data is no longer divided into regions, successive 24 bytes of data are operated at one time, three data masks are set as follows: M1=0xff0000ff0000ff00, M2=0x00ff0000ff0000ff, M3=0x0000ff0000ff0000. Three 8-byte data which is denoted respectively by A1, A2, A3 are extracted by the three data masks at one time, C=(A1&M1)| (A2&M2)|(A3&M3), and thus 24 bytes of data can be operated at one time and the 8-byte valid data is extracted.

Referring to FIG. 3, a specific working process of the security document identification apparatus 300 according to the invention will be described in detail. At the beginning of the work process, the contact image sensor 31 may detect whether a current security document enters into a sampling area, and collect an infrared sample image, a transmission sample image and a white light sample image and obtain corresponding image data $S_{p1}$, $S_{p2}$ and $S_{p3}$ if the current security document enters into the sampling area, and perform the detection continuously if the current security document does not enter into the sampling area. The identification module 32 performs a security document identification based on the image data $S_{p3}$, so as to obtain identification data $S_i$ (information such as the serial number of the current security document) of the security document. The compression module 33 forcibly converts the collected image data $S_{p1}$, $S_{p2}$ and $S_{p3}$ into long integer type image data $S_{11}$, $S_{12}$ and $S_{13}$, and performs a compression operation on the long integer type image data $S_{13}$ so as to obtain coded image data $S_c$. The storage module 34 stores the long integer type image data $S_{11}$ and $S_{12}$ and the coded image data $S_c$. The decompression module 35 recovers the encoded image data $S_c$ to obtain decompressed image data $S_d$. The identification module 32 performs a security document identification and judge the authenticity of the security document based on the long integer type image data $S_{11}$ and $S_{12}$ and the decompressed image data $S_d$, so as to further obtain identification data Si (information such as the type, denomination, orientation, authenticity of the current security document) of the security document.

Those disclosed above are only preferred embodiments of the invention and can certainly not be used to limit the scope of protection of the invention. Therefore, any equivalent modification made according the claimed scope of the invention falls within the scope covered by the invention.

The invention claimed is:

1. A fast storage method of image data, which is used to compress and store the image data, comprising:
   (A1) obtaining long integer type image data;
   (A2) extracting the long integer type image data by using N mutually corresponding data masks via a "bitwise AND" operation, wherein the extraction step comprises: extracting M points from M*N points of each row and extracting one point from L points of each column, wherein N is an integer greater than or equal to 2, L and M are integers greater than or equal to 1; and
   (A3) performing a "bitwise OR" operation for the data extracted respectively by the N data masks, so as to obtain and store coded image data.

2. The fast storage method of the image data according to claim 1, wherein the step (A2) further comprises:
   dividing the long integer type image data into N parts equally, and extracting the long integer type image data in the N parts by using the N mutually corresponding data masks via the "bitwise AND" operation respectively.

3. A security document identification method, comprising:
   (B1) collecting sample images of a current security document and obtaining corresponding image data;
   (B2) performing a security document identification based on the image data of the current security document;
   (B3) forcibly converting the collected image data into long integer type image data; and
   (B4) compressing and storing the converted data image by using the fast storage method of the image data, wherein the fast storage method comprises:
   (A1) obtaining the long integer type image data;
   (A2) extracting the long integer type image data by using N mutually corresponding data masks via a "bitwise AND" operation, wherein the extraction step comprises: extracting M points from M*N points of each row and extracting one point from L points of each column, wherein N is an integer greater than or equal to 2, L and M are integers greater than or equal to 1; and (A3) performing a "bitwise OR" operation for the data extracted respectively by the N data masks, so as to obtain and store coded image data.

4. The security document identification method according to claim 3, wherein the sample images comprise an infrared sample image, a transmission sample image and a white light sample image; and the step (B4) further comprises directly storing the long integer type image data of the infrared sample image and the transmission sample image, and storing the long integer type image data of the white light sample image by using the fast storage method of the image data.

5. The security document identification method according to claim 4, further comprising:

before the step (B1), detecting whether the current security document enters a sampling area, and collecting the image data if yes, else continuously performing the detection.

6. The security document identification method according to claim 4, further comprising:

(B5) recovering the compressed and stored image data; and (B6) judging the authenticity of the current security document based on the image data of the current security document.

7. The security document identification method according to claim 3, wherein the step (A2) further comprises:

dividing the long integer type image data into N parts equally, and extracting the long integer type image data in the N parts by using the N mutually corresponding data masks via the "bitwise AND" operation respectively.

8. A security document identification apparatus, comprising:

a collecting module adapted to collect sample images of a current security document and obtaining corresponding image data;

an identification module adapted to perform a security document identification based on the image data of the current security document, so as to obtain identification data of the security document;

a compression module, comprising:

a conversion unit adapted to forcibly convert the collected image data into long integer type image data; and an encoding unit adapted to extracting the long integer type image data by using N mutually corresponding data masks via a "bitwise AND" operation respectively, and performing a "bitwise OR" operation for the data extracted respectively by the N data masks via so as to obtain and store coded image data, wherein the extraction method comprises extracting M points from M*N points of each row and extracting one point from L points of each column, wherein N is an integer greater than or equal to 2, L and M are integers greater than or equal to 1; and a storage module adapted to store the data.

9. The security document identification apparatus according to claim 8, further comprises a decompression module adapted to recover the encoded image data to obtain decompressed image data.

10. The security document identification apparatus according to claim 8, wherein the encoding unit is further adapted to divide the long integer type image data into N parts equally, and extracting the long integer type image data in the N parts by using the N mutually corresponding data masks via the "bitwise AND" operation respectively.

11. The security document identification apparatus according to claim 8, wherein the collecting module is a contact image sensor.

* * * * *